AUTOMATIC GAIN CONTROL CIRCUIT
Filed Sept. 27, 1962
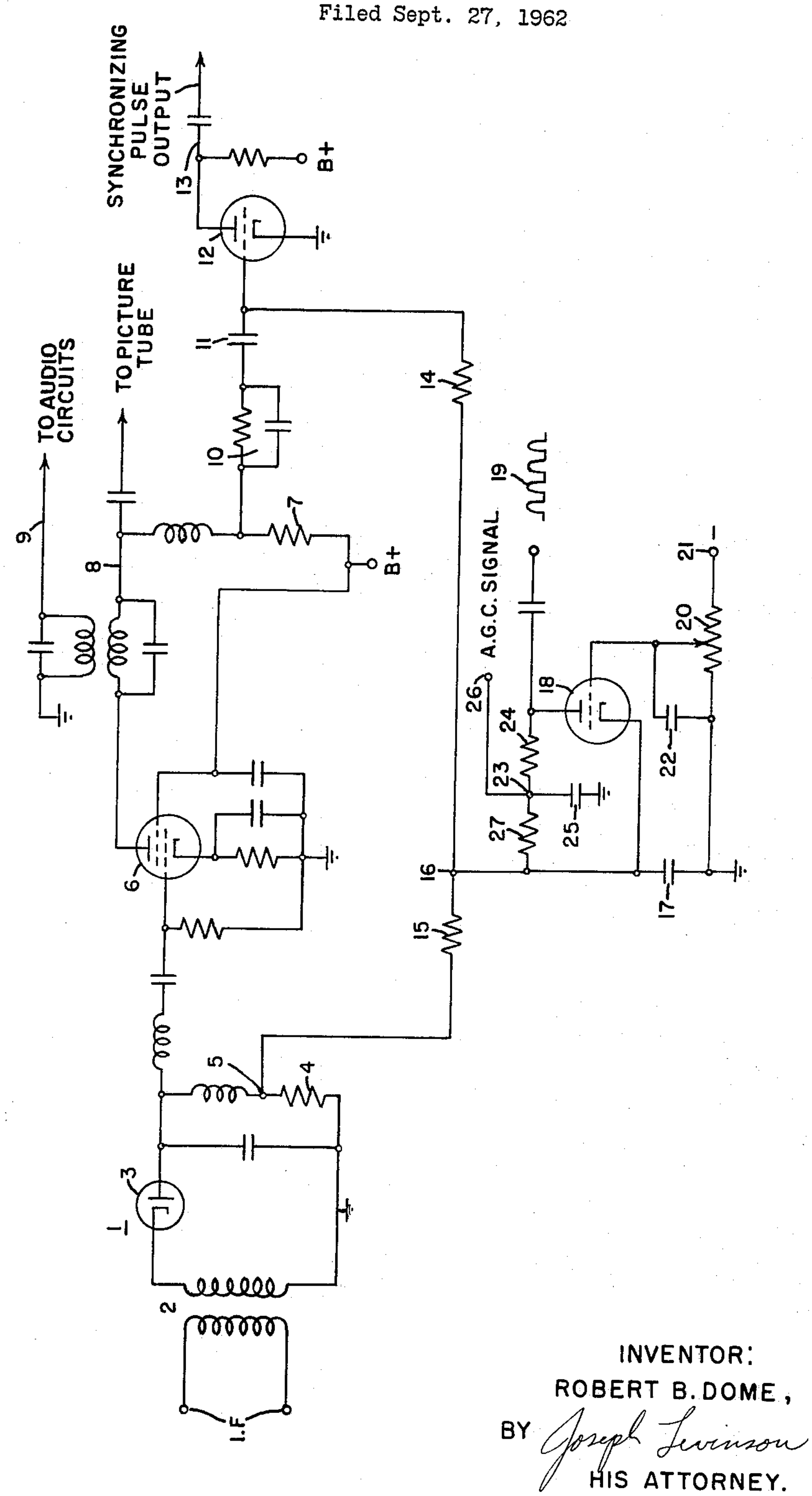
INVENTOR:
ROBERT B. DOME,
BY Joseph Levinson
HIS ATTORNEY.

United States Patent Office 3,236,945
Patented Feb. 22, 1966

3,236,945
AUTOMATIC GAIN CONTROL CIRCUIT

Robert B. Dome, Geddes Township, Onondaga County, N.Y., assignor to General Electric Company, a corporation of New York Filed Sept. 27, 1962, Ser. No. 226,678
4 Claims. (Cl. 178—7.3)

This invention relates to an automatic gain control (AGC) circuit for a television receiver and, in particular, to a circuit which provides an amplified automatic gain control signal.

Prior art AGC circuits for television receivers have employed, as an economical expedient, the average value of the detected video signal to effect gain control in the amplification stages preceding the video detector. Since the average value of the detected video signal is a function of both the received signal strength and the brightness or modulation of the television scene to be produced, undesirable changes in gain result from variations of scene brightness with a constant received signal strength. To attain an AGC signal which is directly proportional to received signal strength and independent of scene brightness, it has been proposed to subtractively combine, in proper proportion, the output signal of the second detector, which is the demodulated video signal, and the signal available at the control grid of the synchronizing signal separator stage, which is proportional to scene brightness.

The automatic gain control potential thus derived is generally insufficient to provide effective gain control and prevent receiver overload during the reception of very strong signals such as may be encountered in prime service areas. In order to furnish sufficient AGC potential to prevent such receiver overload the automatic gain control potential derived may be amplified to application to the amplification stages preceding the video detector. In an AGC amplifying system of this type, however, defective adjustment or failure of the AGC amplifier renders the television receiver free of automatic gain control, thereby requiring the viewer to adjust the contrast control whenever the strength of the received signal changes. The present invention insures the existence of an AGC signal in the receiver at all times during operation.

It is an object of the invention to provide an improved automatic gain control circuit.

It is another object of the invention to provide an improved automatic gain control circuit which furnishes an amplified AGC signal having a magnitude directly proportional to the received signal strength and independent of picture modulation.

It is a further object of the invention to provide an automatic gain control circuit which furnishes an amplified AGC signal and which insures application of an AGC signal to the appropriate receiver stages even though the amplified AGC signal should become unavailable.

Briefly stated, in accordance with the illustrated embodiment of the invention, an AGC signal is derived by subtractively combining the demodulated output signal of the second detector and the signal available at the control grid of the synchronizing signal separator stage, the resulting negative control potential having an amplitude which is directly proportional to the received signal strength and independent of picture modulation. This control potential is amplified and applied through a filter network to a terminal at which the amplified control potential is available as an AGC signal to appropriate amplification stages preceding the video detector. To insure application of an AGC signal to these stages, even though the amplifier may be inoperative or out of adjustment, the control potential is also applied, through an impedance, to the terminal.

The subject matter of the invention is particularly pointed out and distinctly claimed in the concluding portion of the specification. The invention, however, both as to organization and a method of operation, may best be understood by reference to the following description taken in connection with the accompanying drawing which is a circuit diagram of a portion of a television receiver incorporating the present invention.

In practicing my invention, a superheterodyne television receiver of conventional design is provided including a radio frequency amplifier stage, a first detector or mixer stage, a plurality of intermediate frequency amplifier stages, a video or second detector stage and a horizontal and vertical scanning system.

With reference to the drawing, the embodiment of the invention illustrated therein includes a video detector 1, coupled to the last intermediate frequency amplification stage by transformer 2, the video detector serving to demodulate the composite video signal in the television receiver. Video detector 1 comprises a diode 3, and a load resistor 4. The output voltage of video detector 1, appearing across resistor 4, comprises a first potential component which is proportional to the received signal strength and a second potential component representing the picture modulation or scene brightness. The potential at terminal 5 of resistor 4 is negative with respect to ground, becoming more negative as the received signal strength increases or, for a given received signal strength, as the brightness of the transmitted scene decreases, i.e., as the picture becomes darker.

The negative potential output of detector 1 is coupled to video amplifier 6, the amplified output signal appearing across load resistor 7 being applied to the picture tube and to the audio circuits in the receiver over lines 8 and 9 respectively. The output of the video amplifier, which inverts the negative-going potential component representing scene brightness to render it positive-going, is coupled by a medium-time-constant circuit 10 and a capacitor 11 to synchronizing signal separator stage 12, which provides the synchronizing pulse output, on line 13. The grid leak resistor 14 of synchronizing signal separator stage 12 is connected to terminal 5 of video detector load resistor 4 through resistor 15. The common connection point 16 of resistors 14 and 15 is connected to ground through capacitor 17.

Capacitor 11 and grid leak resistor 14 form a slow-time-constant circuit to maintain a high negative voltage on the grid of the synchronizing signal separator 12. This negative voltage appears across resistor 14 along with the positive-going potential component representing scene brightness. The negative output voltage of video detector 1 including the negative-going potential components representing received signal strength and scene brightness, appears across resistor 15. Resistors 14 and 15 thus serve as a voltage divider and, if the values of resistors 14 and 15 are properly proportioned, the negative-going potential component representing scene brightness appearing across resistor 15 and the positive-going potential component representing scene brightness appearing across resistor 14 are equal and opposite and, hence, cancel at their common connection point 16. Cancellation will occur when $R14=(G-1)R15$, where R14 and R15 are the resistance values of resistors 14 and 15 respectively, and where G is equal to the gain of the video amplifier. Upon cancellation of the potential component representing scene brightness in the resistive combining circuit, the control potential existing at common point 16 is proportional to the potential component in the video detector output which represents only the received signal strength.

To augment the control potential at common point 16 in order to provide more effective gain control, especially in the presence of strong signals, a gain control amplifier 18, which is arranged as a grid-controlled plate-cathode rectifier, is provided. The alternating voltage, indicated at 19, which is to be rectified in AGC amplifier 18 to generate the AGC signal, may be horizontal flyback pulses obtained from the horizontal scanning system of the receiver. The grid electrode of amplifier 18 is biased negatively at a pre-set voltage determined by the setting of the potentiometer 20, the negative voltage at terminal 21 being obtained from an appropriate source. A by-pass capacitor 22 is connected from the grid of amplifier 18 to ground to reduce the horizontal pulse voltage that might otherwise exist at the grid as a result of capacitive coupling between plate and grid. The cathode electrode of amplifier 18 is connected to common point 16.

With the grid potential of the amplifier 18 being fixed upon adjustment of potentiometer 20, the magnitude of the control potential at the cathode electrode controls the D.C. potential at the anode electrode of amplifier 18, the latter potential comprising the amplified AGC signal. This amplified AGC signal is applied to circuit point 23 through a filter network comprising resistor 24 and capacitor 25. Gain control terminal 26 is connected to circuit point 23 for rendering the amplified automatic gain control signal available to appropriate amplification stages proceding the video detector.

To insure the availability of an automatic gain control signal at terminal 26 in the event amplifier 18 becomes inoperative or out of adjustment, common point 16 is connected to circuit point 23 through resistor 27, thereby making a negative control potential proportional to received signal strength available at terminal 26 for automatic gain control purposes.

Since other modifications varied to fit particular operating requirements and environments will be apparent to those skilled in the art, this invention is not considered limited to the examples chosen for purposes of disclosure and covers all changes and modifications which do not constitute departures from the true spirit and scope of this invention.

What is claimed as new and desired to be secured by Letters Patent of the United States is:

1. In a television receiver having a video detector for demodulating a composite video signal and for applying the demodulated video signal to a video amplifier, an automatic gain control system comprising:

(a) means connected to said video detector for deriving at a first circuit point a negative control potential having a magnitude proportional to the received signal strength and independent of scene brightness;

(b) a gain control amplifier;

(c) a gain control terminal;

(d) said gain control amplifier being connected between said first circuit point and said terminal to apply an amplified automatic gain control signal to said terminal for application to an appropriate point in said receiver; and (e) said first circuit point also being directly connected to said terminal by means connected in shunt with said amplifier to apply said control potential in unamplified form to said terminal to serve as an automatic gain control signal to tend to maintain the output level of the video amplifier constant if said gain control amplifier is inoperative or out of adjustment.

2. The automatic gain control system of claim 1 in which said last named means is a resistor.

3. In a television receiver for receiving and demodulating a composite video signal, an automatic gain control system comprising:

(a) a video detector for deriving from the received video signal a first potential component proportional to the received signal strength and a second potential component representing scene brightness;

(b) a video amplifier coupled to said video detector for amplifying and inverting the output of said detector;

(c) a synchronizing signal separator stage coupled to said video amplifier and having available at its input a signal representing only scene brightness and inverted with respect to said second component;

(d) combining means connected to said detector and to the input of said separator stage for deriving at a common point a negative control potential having an amplitude directly proportional to the received signal strength and independent of scene brightness;

(e) a gain control amplifier;

(f) a gain control terminal;

(g) said amplifier being connected between said common point and said terminal to apply an amplified automatic gain control signal to said terminal for application to an appropriate point in said receiver; and (h) said common point also being directly connected to said terminal by means connected in shunt with said amplifier to apply said control potential in unamplified form to said terminal to serve as an automatic gain control signal if said amplifier is inoperative or out of adjustment.

4. The automatic gain control system of claim 3 wherein said last named means is a resistor.

References Cited by the Examiner

UNITED STATES PATENTS 2,989,588 6/1961 Thomas ------------ 178—7.3

DAVID G. REDINBAUGH, *Primary Examiner.*